Patented Nov. 9, 1948

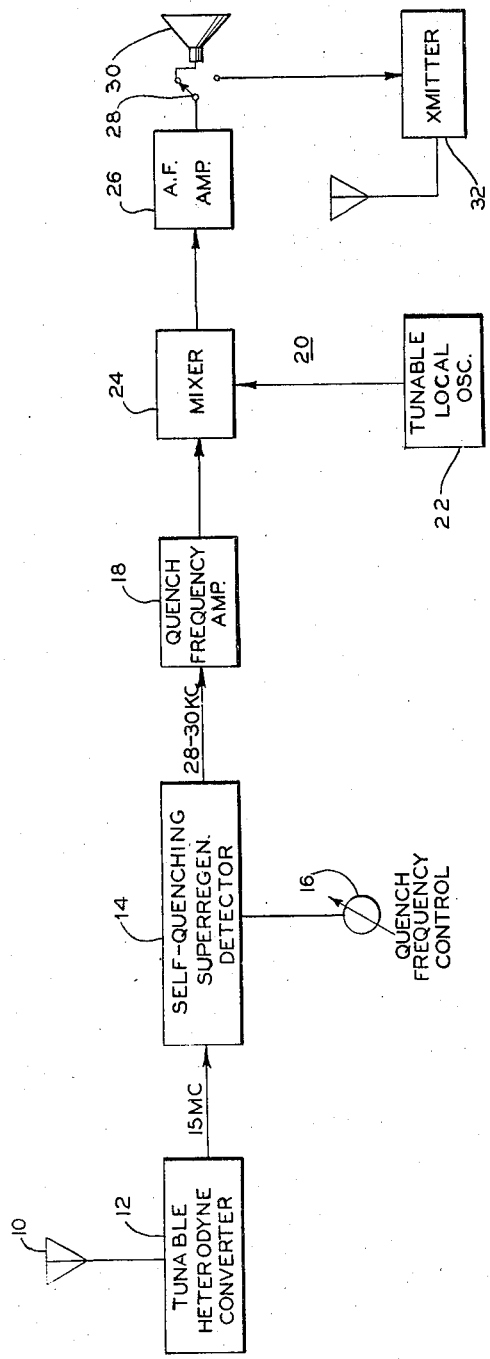

2,453,160

UNITED STATES PATENT OFFICE 2,453,160

FIELD INTENSITY METER

Abraham Ringer, Eatontown, N. J., assignor to the United States of America as represented by the Secretary of War Application October 24, 1945, Serial No. 624,281

6 Claims. (Cl. 250—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to field-intensity indicators, particularly to a novel indicator which can be used for adjusting the operating characteristics of antennas with a minimum of time and personnel.

In adjusting a directional antenna, it is the practice to place a field-intensity meter in the radiation field of the antenna along the desired direction and then to orient the antenna pattern until the meter indicates the desired directional characteristic. In order that the adjustment of the antenna be unaffected by the presence of the field-intensity meter and the power lines connected thereto, it is desirable to place the meter outside of the induction field of the antenna, and preferably three or more wavelengths away from the antenna. Where the wavelength is relatively long, it has been necessary to have one person adjust the antenna and another person to read the meter.

It is a principal object of this invention to provide a novel field-intensity meter which indicates field intensity by audible means.

It is a further object of this invention to provide a novel field-intensity meter in which variations in field intensity are indicated by variations in pitch of an audible tone which can be heard at a considerable distance, whereby the operator making the antenna adjustments can also determine the field intensity.

In accordance with this invention, the indicator comprises a means to pick up the radiated wave and impress it upon a self-quenching superregenerative detector, which quenches at a rate which is dependent upon the field intensity of the input wave. The quench frequency may then be amplified and heterodyned with the output of a local oscillator to yield an audible beat frequency which is amplified and impressed upon a loud speaker, the output of which can be heard at a considerable distance by the operator while he is adjusting the directional antenna. Or, the audio output can be used to modulate a small transmitter operating on a different frequency channel and then received by the operator making the antenna adjustments.

For a better understanding of the invention, together with other and further objects thereof, reference is had to the following description taken in connection with the single figure of the accompanying drawing, which shows a block diagram of the invention.

The preferred embodiment of the invention includes an antenna 10, which picks up the transmitted wave and applies it, through a tunable heterodyne converter 12, to the input circuit of a self-quenched superregenerative detector 14. Since it is characteristic of a self-quenching superregenerative detector to quench itself at a rate which is dependent upon the amplitude of the signal input, the frequency of the quenching potentials in the output of the detector will vary with the field intensity. Where the received wave is of relatively high frequency, i. e., in the 15 mc. region or higher, the converter may be eliminated. For lower frequencies, use of the converter is desirable to change said frequencies to a higher frequency, because in self-quenching superregenerative detectors the quenching frequency as well as the rate of change of quenching frequency are dependent upon the frequency of the signal input. Hence, to get a large variation in quench frequency, preferably in the superaudible region, use of converter 12 to raise the frequency of the input is desirable.

The detector 14 is also provided with a control 16 for controlling the quenching frequency and the limits of variation thereof by variation of the time constant of the usual grid leak and condenser incorporated in the detector. The detector 14 differs from the usual form of superregenerative detector in that the output thereof is not provided with any means to filter out the quench-frequency potentials. Said quench-frequency potentials therefore appear in the output of the detector and are amplified by a quench-frequency amplifier 18. Because of the high frequency of the waves impressed upon the detector input, the quench-frequency of the self-quenching detector 14 is usually in the superaudible region. To convert said superaudible frequency currents to audible currents, use is made of a heterodyne converter 20 comprising a local oscillator 22, which is preferably tunable, and a mixer 24. The audio output of the mixer is amplified to any desired degree by an audio frequency amplifier 26, and then applied, through a selector switch 28, to a loud speaker 30 or to the modulation circuit of a small transmitter 32 operating in a frequency band which is considerably removed from the frequency of the antenna being tested.

This completes the description of the invention. In operation, the tunable heterodyne converter 12 converts to about 15 mc. the antenna currents which, in one particular embodiment, range from 3 mc. to 6 mc. The superregenerative detector 14 detects the 15 mc. currents. Because of the self-quenching action of detector 14, the quench-frequency varies with the signal strength impressed upon the input of the detector. With a 15 mc. input the quenching-frequency varies from 28 kc. to 38 kc. with variation in signal strength. The quench-frequency potential is then amplified at 18 and then changed by converter 20 to an audible frequency current in a range of which the limits can be controlled by adjustment of either the quench-frequency control 16 and/or frequency of local oscillator 22. The audible frequency currents are now amplified at 26 and then reproduced by loud speaker 30 at such volume that it is within the hearing range of the operator adjusting the antenna. Or, the audio currents can be used to modulate transmitter 32, the output of which is picked up by the operator. It is to be understood that a frequency meter or other type of frequency-responsive circuit may be used in place of the loud speaker.

In adjusting the effective direction of a directional antenna, with the use of this invention, the operator moves the antenna or adjusts the antenna characteristics until the frequency of the audible note heard is either a maximum or minimum, thus indicating a maximum or a null in the field intensity, respectively.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A field-intensity indicator for high frequency radio waves comprising a superregenerative detector upon the input circuit of which said waves are impressed, the quenching frequency of said detector varying with variation in amplitude of said radio waves, and frequency indicator means controlled by the output of said detector.

2. A field-intensity indicator for high frequency radio waves comprising a superregenerative detector upon the input circuit of which said waves are impressed, the quenching frequency of said detector varying with variation in amplitude of said radio waves, and frequency indicator means controlled by the quenching-frequency output of said detector.

3. A field-intensity indicator for high frequency radio waves comprising a self-quenching superregenerative detector upon the input circuit of which said waves are impressed, and frequency indicator means controlled by the output of said detector.

4. A field-intensity indicator for radio waves comprising an antenna responsive to said waves, a heterodyne converter for converting said waves to a higher frequency, a self-quenching superregenerative detector upon the input circuit of which said higher frequency waves are impressed, and frequency indicator means controlled by the output of said detector.

5. An aural field-intensity indicator for high frequency radio waves comprising an antenna responsive to said waves, a self-quenching superregenerative detector upon the input circuit of which said waves are impressed, a heterodyne converter coupled to the output of said detector to convert the quench-frequency output thereof to a lower frequency, and acoustic frequency indicator means energized by said lower frequency.

6. An aural field-intensity indicator for radio waves comprising an antenna responsive to said waves, a tunable heterodyne converter for converting said waves to a higher, fixed frequency, a self-quenching, unfiltered superregenerative detector upon the input circuit of which said fixed-frequency waves are impressed, said fixed-frequency being such that the quench-frequency is superaudible, means in said detector for controlling the time constant of the quenching circuit, a quench-frequency amplifier coupled to the output of said detector, a tunable heterodyne converter coupled to said amplifier to convert said quench-frequency output to an audible frequency, and acoustic frequency indicator means energized by said audible frequency.

ABRAHAM RINGER.

REFERENCES CITED

The following references are of record in the file of this patent:

UNITED STATES PATENTS

| Number | Name | Date |
|---|---|---|
| 1,788,078 | Balsley | Jan. 6, 1931 |
| 1,971,347 | Hyland | Aug. 28, 1934 |
| 2,148,287 | Becker | Feb. 21, 1939 |
| 2,201,020 | Bagno | May 14, 1940 |
| 2,393,717 | Speaker | Jan. 29, 1946 |